US012636922B2

(12) United States Patent
Huett et al.

(10) Patent No.: US 12,636,922 B2
(45) Date of Patent: May 26, 2026

(54) FORCE AND POSITION SENSING SYSTEM FOR A TOWED VEHICLE

(71) Applicant: OZX IP PTY LTD, Campbellfield (AU)

(72) Inventors: Andrew Huett, Campbellfield (AU); Neil Silke, Campbellfield (AU)

(73) Assignee: OZX IP PTY LTD, Campbellfield (AU)

( * ) Notice: Subject to any disclaimer, the term of this patent is extended or adjusted under 35 U.S.C. 154(b) by 559 days.

(21) Appl. No.: 18/009,582

(22) PCT Filed: Jun. 10, 2021

(86) PCT No.: PCT/AU2021/000041
§ 371 (c)(1),
(2) Date: Dec. 9, 2022

(87) PCT Pub. No.: WO2021/248175
PCT Pub. Date: Dec. 16, 2021

(65) Prior Publication Data
US 2023/0211640 A1      Jul. 6, 2023

(30) Foreign Application Priority Data
Jun. 10, 2020    (AU) ................................. 2020901908

(51) Int. Cl.
*B60D 1/30*          (2006.01)
*B60D 1/62*          (2006.01)
(Continued)

(52) U.S. Cl.
CPC ................. *B60D 1/30* (2013.01); *B60D 1/62* (2013.01); *B60Q 9/00* (2013.01); *G01L 5/1627* (2020.01)

(58) Field of Classification Search
CPC .......... B60D 1/145; B60D 1/248; B60D 1/30; B60D 1/305; B60D 1/50; B60D 1/62; B60Q 9/00; G01L 5/1627
See application file for complete search history.

(56) References Cited

U.S. PATENT DOCUMENTS 5,988,000 A * 11/1999 Adams .................... G01L 5/136
73/862.044
9,464,953 B2 * 10/2016 Wirthlin .................. G01L 5/136
(Continued)

FOREIGN PATENT DOCUMENTS

KR       20180051194 A  *  5/2018
WO      WO-2015073960 A1 *  5/2015   ............... B60D 1/04

*Primary Examiner* — Adam D Rogers
(74) *Attorney, Agent, or Firm* — Bochner PLLC; Andrew D. Bochner

(57)          ABSTRACT

A hitching system for connecting a towed vehicle to a towing vehicle comprising: a connector member for engaging with a connection point on the towing vehicle; a shaft member connected at one end to the connector member and at a second opposing end to a housing fixed to the towed vehicle; a plurality of sensor elements mounted to said shaft member, at least one of the sensor elements configured to measure a lateral force present in the shaft member during towing of the towed vehicle by the towing vehicle; and a computer processor mounted with respect to the towed vehicle for receiving a signal from at least one of the sensor elements representative of the measure of the lateral force present in the shaft member and processing said signal to control motion of the towed vehicle.

7 Claims, 3 Drawing Sheets

(51) Int. Cl.
    *B60Q 9/00*         (2006.01)
    *G01L 5/1627*     (2020.01)

(56)                References Cited

U.S. PATENT DOCUMENTS

| | | | |
|---|---|---|---|
| 10,589,583 B2 * | 3/2020 | Niedert | B60D 1/62 |
| 10,670,479 B2 * | 6/2020 | Reed | G01L 5/136 |
| 10,696,109 B2 * | 6/2020 | Gießibl | G01L 1/125 |

* cited by examiner

FORCE AND POSITION SENSING SYSTEM FOR A TOWED VEHICLE

RELATED APPLICATION

The present application claims priority from Australian provisional patent application number 2020901908, filed on 10 Jun. 2020, the entire contents of which are incorporated herein by reference.

FIELD OF INVENTION

The present invention relates generally to towed vehicles, such as trailers, caravans, camper trailers and the like, and in particular, to a system for sensing a position and forces associated with a towed vehicle during a towing situation.

BACKGROUND OF THE INVENTION

Recreational vehicles, such as caravans and camper trailers, are a popular form of portable accommodation used by many as an economic and enjoyable way in which to experience the outdoors in an independent and comfortable manner. Such vehicles are typically hitched behind a passenger vehicle and towed to a destination where they are unhitched from the towing vehicle to be set up as an accommodation site in accordance with the user's personal preferences.

The act of towing a caravan or trailer requires a degree of expertise that is outside of a normal driving experience. The towed vehicle is typically connected to the towing vehicle by way of a dedicated coupling system, often referred to as a hitch. The hitch may be in the form of a tow ball mounted on the end of the towing vehicle to which the hitch of the towed vehicle attaches. In such an arrangement, there exists a degree of pivotal movement of the towed vehicle with respect to the towing vehicle about this coupling. This can cause control issues between the towing vehicle and the towed vehicle that can compromise the safety of the vehicles, especially if the towing vehicle is being driven by an inexperienced driver.

A variety of control systems have been proposed to improve the stability of the towed vehicle during a towing situation. Such systems are able to provide various degrees of feedback to the towing vehicle to ensure that the location of the towed vehicle with respect to the towing vehicle is maintained within predetermined limits, and the forces between the towing vehicle and the towed vehicle are acceptable. Such feedback has generally been used to alter the driving characteristics of the towing vehicle.

In recent times, towed vehicles, in particular caravans as well as other trailers, have employed electric propulsion systems to drive the vehicle as it is being towed. Through the use of electric motors being driven by battery systems, the towed vehicle is able to assist the towing vehicle under certain conditions such as when travelling over sand or mud, or accelerating in traffic or up hills. With the increasing popularity of off-road vehicles and off-grid usage of caravans and camping trailers, users are requiring more electrical energy to perform these tasks, especially as use of electrical convenience and communication systems increases. This demand can be filled to a substantial degree by electrically propelled caravans also generating or regenerating electric power while driving.

With the advent of such propulsion systems which are also capable of generating electric power in towed vehicles, a control system is required to control the propulsion characteristics. Thus, to provide vehicle dynamic control and/or power generation functions it is important to obtain information about the operating state of the towed vehicle, including the magnitude and direction of the forces in the coupling.

In this regard, sway is a common problem in most towing situations, wherein the towed vehicle experiences lateral movement with respect to the towing vehicle in an oscillating manner. Over time, the degree of lateral movement of the towed vehicle can build up, causing significant stability problems in the towing vehicle. In recent times, such sway issues are able to be mitigated by employing sway detection systems in association with automatic application of one or more of the trailer's brakes. Inputs to the sway detection systems can include a lateral force sensor to provide key information for sway mitigation. Other inputs are the relative yaw, pitch or roll angles between the towing and towed vehicles. Such sensed data regarding the relative attitude of the two vehicles, and the force applied by the towing vehicle to the towed vehicle are input to the processor to determine the amount and direction of tractive force to apply.

Whilst simple systems have been employed to provide such control to the towed vehicle, no system exists which gather multi axis forces to fully and accurately measure the forces and/or orientation of the caravan relative to the towing vehicle. Thus, there is a need to provide such a system to achieve this purpose.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the present invention there is provided a hitch for connecting a towed vehicle to a towing vehicle comprising:

a connector member for engaging with a connection point on the towing vehicle vehicle;

a shaft member connected at one end to the connector member and at a second opposing end to a housing fixed to the towed vehicle;

a plurality of sensor elements mounted to said shaft member, at least one of the sensor elements configured to measure a lateral force present in the shaft member during towing of the towed vehicle by the towing vehicle; and a computer processor mounted with respect to the towed vehicle for receiving a signal from at least one of the sensor elements representative of the measure of lateral load present in the shaft member and processing said signal in accordance with a predetermined purpose.

In one embodiment, the connector member may be connected to the connection point on the vehicle in an articulated manner such that multiple axes of forces acting on the towed vehicle are measured by the plurality of sensors. The multiple axis of forces may include forces acting in a lateral direction, a vertical direction and a fore-and-aft direction.

The plurality of sensors may be mounted about a periphery of the shaft member at 90° spacings. The shaft member upon which the plurality of sensors are mounted may be hollow.

A rotation sensor may also be provided on the hitch for measuring rotation forces acting on the shaft member with respect to the towed vehicle.

The shaft member may pass through a main body fixed to a chassis of the towed vehicle. The main body may have a central recess through which the shaft member passes and the computer processor may be mounted to the main body.

BRIEF DESCRIPTION OF THE DRAWINGS

The invention may be better understood from the following non-limiting description of preferred embodiments, in which.

DETAILED DESCRIPTION

The present invention will be described below in relation to a caravan of the type that is to be towed by a vehicle. However, it will be appreciated that the present invention could be equally employed in any variety of trailers and camper trailers that are to be towed by a vehicle and still fall within the spirit of the present invention.

Figure 1:
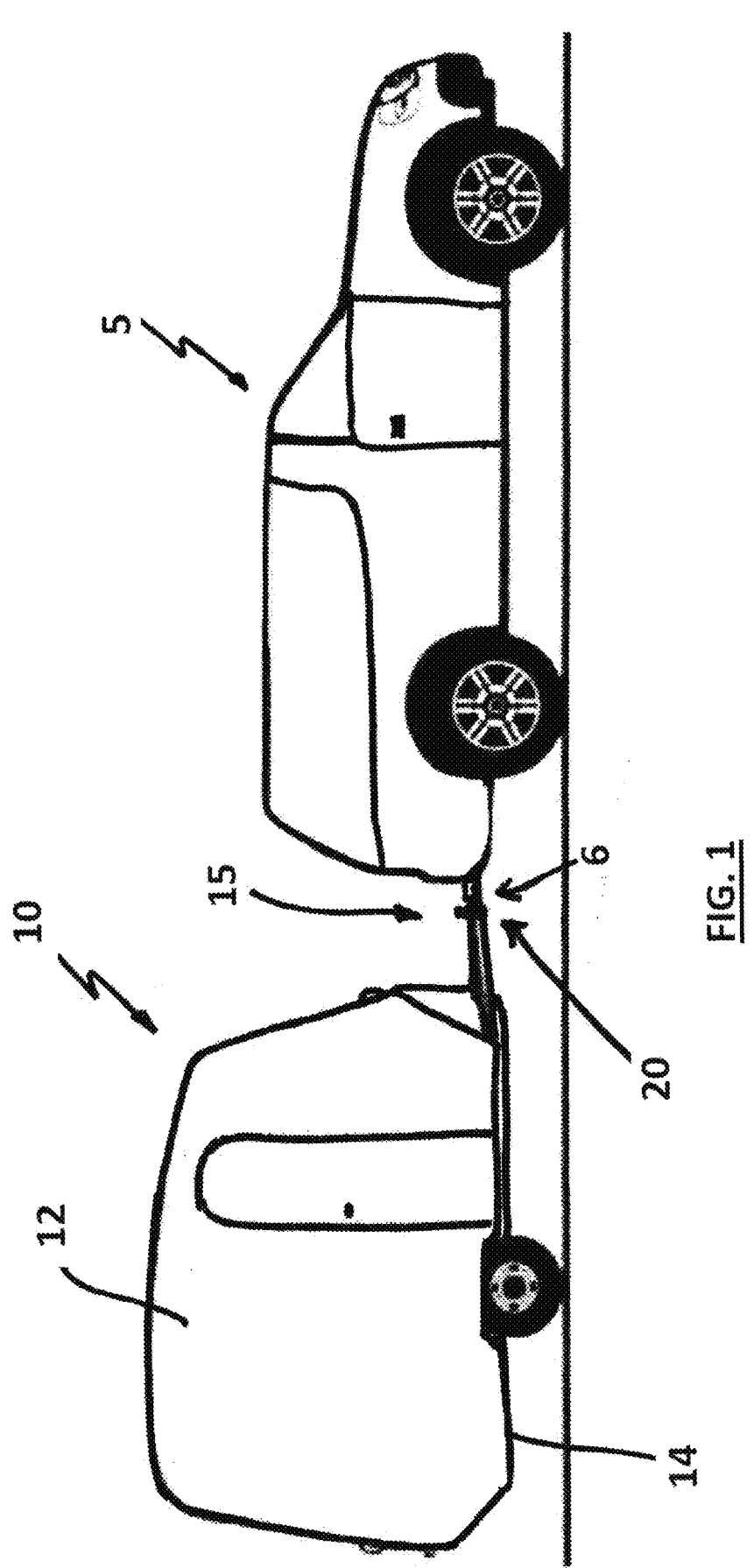
FIG. 1 is a side view of towed vehicle connected to a towing vehicle in accordance with an embodiment of the present invention.

Referring to FIG. 1, a towed vehicle or caravan 10 is depicted being towed behind a towing vehicle 5 in accordance with an embodiment thereof. The caravan 10 is of a conventional type and comprises a chassis 14 that supports a body 12. The body 12 forms an enclosure over the top of the chassis 14 and is configured to function as a mobile accommodation space, as is well known in the art. The caravan 10 is attached to the towing vehicle 5 by way of a coupling system 20.

In the embodiment as depicted, the coupling system 20 comprises a hitch 15 that is attached to a front end of the chassis 14 of the caravan 10, which attaches to a tow ball 6 on the rear of the towing vehicle 5. It will be appreciated that the coupling system for attaching the towed vehicle to the towing vehicle may be configured in a variety of different ways so as to provide secure attachment as well as the transfer of control signals from the towing vehicle 5 to the caravan 10 so as to operate the turning signals of the caravan 10 and various other functions as would be well understood by those skilled in the art.

Figures 2, 3:
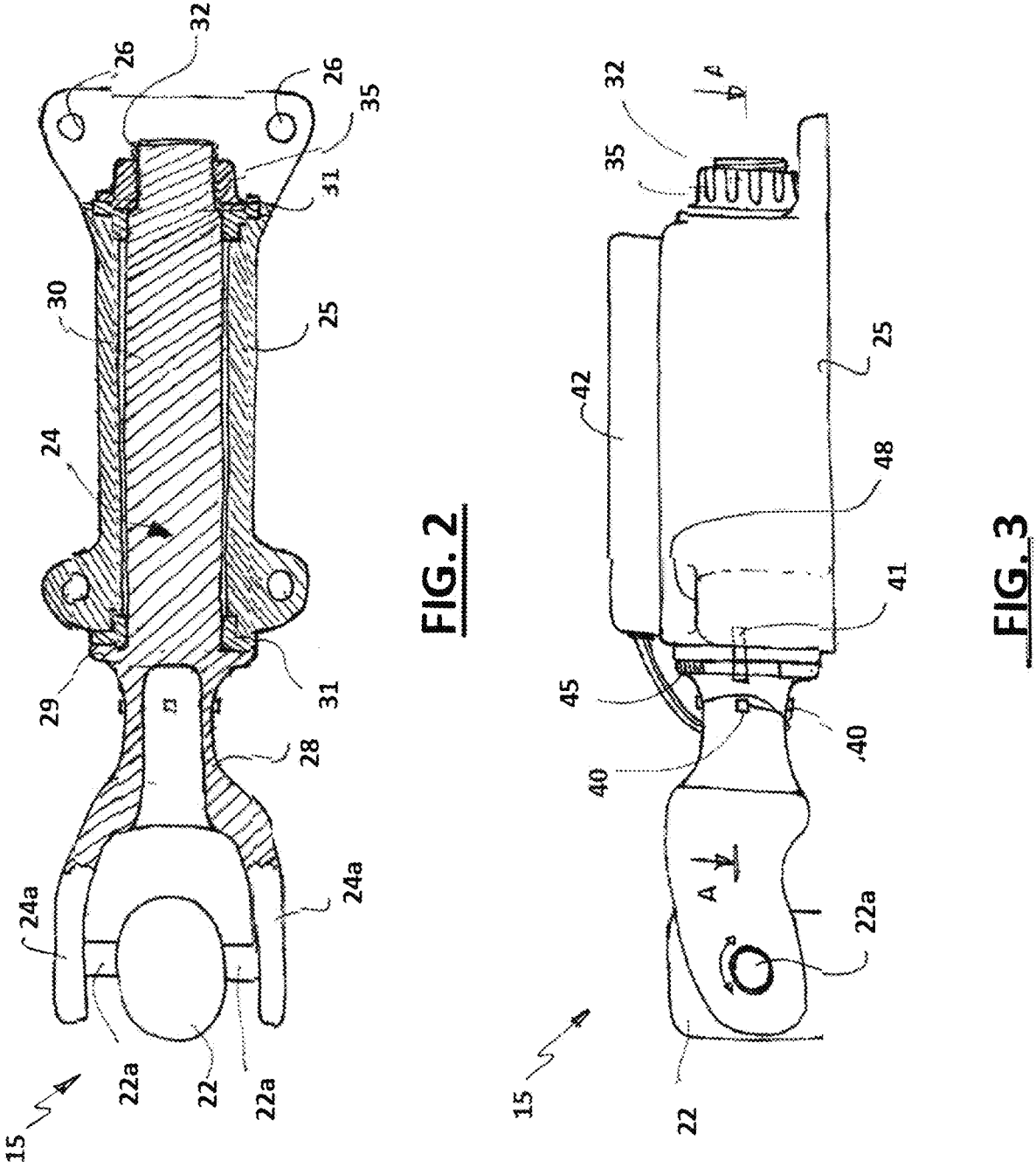
FIG. 2 is a cross-sectional top view of a hitch in accordance with an embodiment of the present invention taken through line A-A of FIG. 3.
FIG. 3 is a side view of the hitch of FIG. 2.

The hitch 15 of the coupling system 20 is depicted in isolation in FIG. 2 and FIG. 3.

The hitch 15 generally comprises a main body 25 having holes 26 formed therein to facilitate attachment of the hitch 15 to the chassis 14 of the caravan 10, by way of bolts, screws or similar fastening means. When the hitch 15 is correctly positioned for attachment to the chassis 14 of the caravan 10, a shaft member 24 projects from the main body 25 to extend beyond the chassis (not shown) to connect with the vehicle connection point, typically a tow ball (not shown).

A connector member 22 is mounted to the end of the shaft member 24 to facilitate connection with the tow ball of the towing vehicle. In one embodiment, the connector member 22 has a cup shape that is configured to fit over the tow ball (not shown) of the towing vehicle. The connector member 22 is pivotally mounted on the end of the shaft member 24 to provide articulated movement of the caravan 10 with respect to the towing vehicle 5. To facilitate this articulated movement of the connector member 22, the end of the shaft member 24 terminates in a pair of finger members 24a which are spaced apart to receive the connector member 22 therebetween. The connector member 22 has a pair of pins 22a that each project from opposing sides of the connector member 22 and share a common longitudinal axis. The end of pin 22a is received within a bearing 23 provided in the finger members 24a of the shaft member 24.

The shaft member 24 has a hollow neck portion 28 that extends from the finger members 24a to a flange portion 29 which is configured to abut the main body 25, as shown in FIG. 2. The shaft member 24 then comprises a solid tubular portion 30 that extends through a central recess provided in the main body 25 so as to project through a rear end of the main body 25. Each end of the central recess of the main body 25 is provided with bearings 31, such that the tubular portion 30 of the shaft member 25 is free to rotate about its longitudinal axis during use. The distal end of the tubular portion 30 has a threaded region 32 that is able to receive a nut member 35 thereon. The nut member 35 is able to be screwingly moved along the threaded region 32 so as to tighten/loosen the shaft member 24 with respect to the main body 25 to as required, to ensure that the shaft member 24 is prohibited from movement in the longitudinal direction with respect to the main body.

Turning to FIG. 3, the three axial sensors of the system are depicted. In the hollow neck portion 28 of the shaft member 24, a plurality of strain sensors 40 are mounted about the circumference of the hollow neck portion 28. The strain sensors comprise strain or displacement gauges mounted within recesses formed in the hollow neck portion, typically at 90° intervals about the neck portion 28. Such an arrangement provides a tri-axial resolution of forces acting upon the shaft member 24, whilst retaining durability of the system. In the preferred form of the invention as depicted, the strain sensors 40 are mounted in the hollow neck portion 28 of the shaft member 24. Alternatively, the strain sensors 40 could be mounted in a solid region of the shaft member 24; however, in such an arrangement it would be preferred for material of the shaft member 24 to be removed beneath the strain sensors 40 to allow more strain in the shaft member material, and hence more accurate measurement of forces present therein.

Each of the strain sensors 40 are in communication with a computer device 42 mounted to an upper surface of the main body 25. In a preferred from, the strain sensors 40 are connected to the computer device 40 by way of wires to communicate sensed signals for processing. Alternatively, to avoid damage to the wires, a wireless gauging system may be employed or a rotation limiter 41 may be used to limit the degree of rotation of the shaft member 24 with respect to the computer device 42. In the event of excessive force on the wires, the rotation limiter 41 may be configured to yield or break, thereby protecting the towing vehicle from being forced to roll-over in the event of caravan roll-over (or vice versa). To further minimise forces on the wires connecting the strain sensors to the computer device 42, a clock spring(not shown) or similar device may be used to reduce bending fatigue of the wires as the hitch rotates under use, particularly during off-road use of the caravan.

Further to this, a heat shield/shroud or the like may be provided in associate with the strain sensors to prevent solar heating of the sensors which may increase errors in the sensed results. Such shrouds/shields may also provide protection against road debris and natural elements that the sensors are exposed to during use.

The computer device 42 comprises a CPU and associated electronics, such as sensor reading devices and the like, and is capable of processing signals received from the sensor elements of the system and transmitting communication signals to remote devices associated with the driver of the towing vehicle or a control system of the towed vehicle, for use in controlling the drive system for propulsion of the towed vehicle and/or energy regeneration system of the towed vehicle. The communications system within the computer device 42 may include a wired communication system, an RF communication system, telecommunication system, zigbee, wi-fi, Bluetooth or any other system that is capable of communicating signals to remotely located processing devices. In this regard, the computer device 42 may include a power source, such as a battery, for powering the electrical components contained therein, or may be in communication with a vehicle battery, solar cell or generator provided in the towed vehicle.

An angular position sensor 45 is also provided to measure the angular position of the towed vehicle with respect to the towing vehicle. As the shaft member 24 is free to rotate within the main body 25, the angular position sensors 45 are mounted on the shaft member adjacent the flange portion 29, as shown. This enables the angular position of the shaft member 24 to be measured relative to the body of the towed vehicle, represented by the main body 25. Such a measurement is a useful input to a dynamic control system, especially during off-road usage of the system, as it can be used to control the towing situation to avoid the likelihood of roll-over of the towed vehicle.

An additional safety sensor 48 may be employed to detect the presence and application of safety measures, such as safety chains connecting the towed vehicle to the towing vehicle. The safety sensor 48 may employ the use of insulating bushes that allow detection of a safety chain by electrical means, such as resistance or megger testing. The safety sensor is able to readily detect whether the safety chains or similar safety devices have been employed between the towed and towing vehicles and provide an appropriate signal to the relevant remote control system.

As previously discussed, as the hitch system of the present invention employs an articulated connector member 22, bending moments associated with the vehicle connection are minimised in the system, thereby greatly reducing the likelihood of errors being collected in the sensed data, thus increasing the accuracy of the overall system. Such an articulated system as that proposed by the present invention allows for measurement in up to 3 axes associated with the towing/coupling system.

Figures 4, 5:
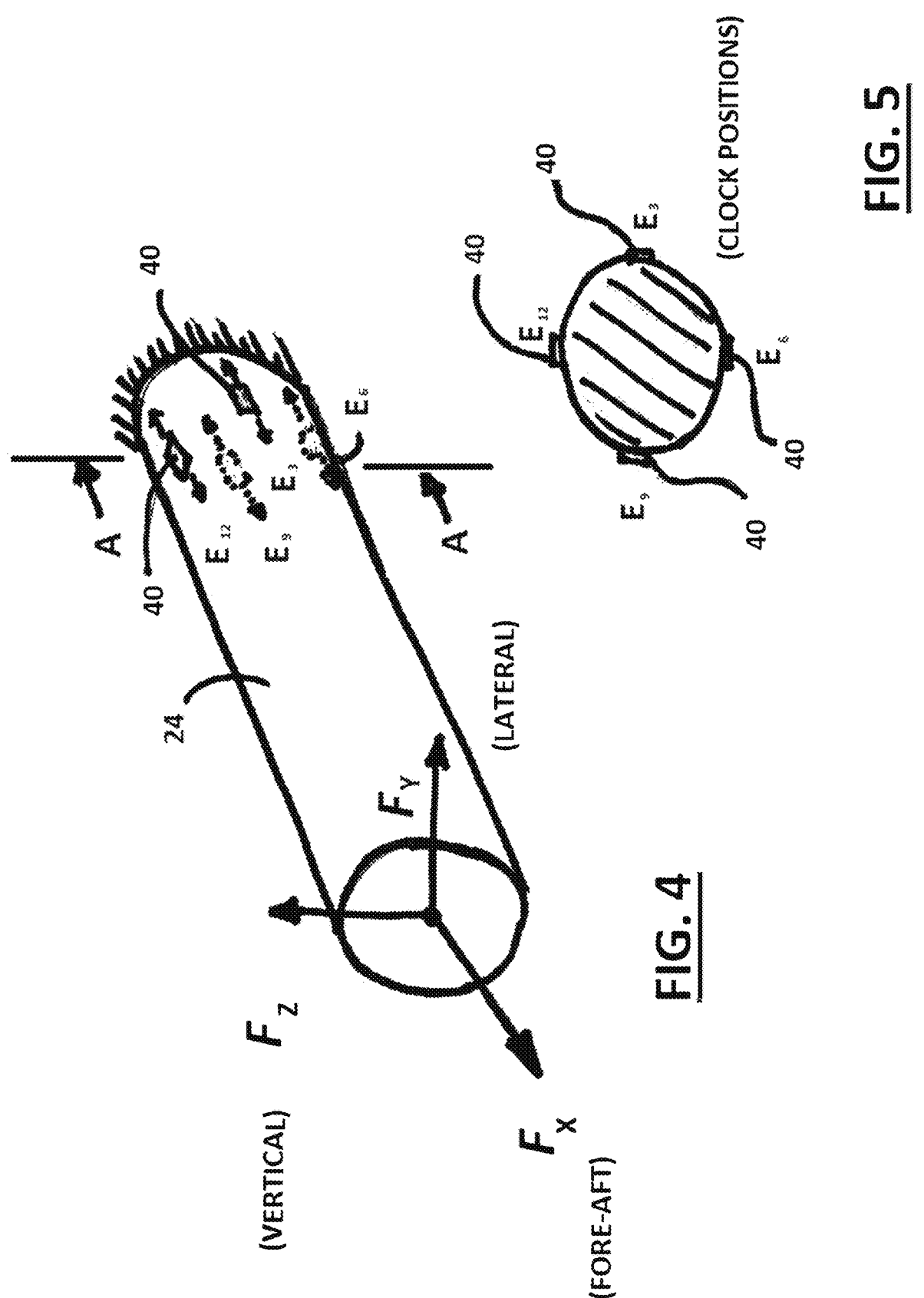
FIG. 4 is a force diagram representing the manner in which forces are measured using the hitch of FIGS. 2 and 3.
FIG. 5 depicts a cross section of the shaft member of the hitch depicting the manner in which the sensor elements are positioned.

The manner in which the tri-axial forces can be determined in the system of the present invention is depicted in FIGS. 4 and 5. In these Figures, the shaft member 24 is depicted with each of the strain sensors 40 located about circumference of the shaft member 24 at 90° intervals, or at 12 o'clock, 3,o'clock, 6 o'clock and 9'clock positions (FIG. 5).

To determine forces acting in the X (fore-aft), Y (lateral) and Z (vertical) axes, strain gauge readings are used in the manner as follows:

$$F_Z = \text{average of } E_6 \& {-}E_{12}$$

$$F_Y = \text{average of } E_9 \& {-}E_3$$

$$F_X = \text{average of } (E_3 {-} E_9) \& (E_{12} {-} E_6)$$

As the readings are averaged, any errors in the readings are minimised.

In the above described system, if the towed vehicle is stationary but connected to the towing vehicle, the hitch vertical load can be directly measured. This is particularly useful when adding luggage, fluids and other weighted elements to the towed vehicle so as to achieve the correct "tow ball" load, which is usually specified as 5 to 10% of the mass of the towed vehicle. This percentage can be calculated using the last known weight of the towed vehicle. Once towing begins (braking and accelerating), the exact percentage tow ball weight can be calculated by determining the overall trailer weight using the elementary physics formula $F = m{\cdot}a$ (where m=mass; a=acceleration). It will be appreciated that a more accurate assessment of the weight factors can be made by factoring in the gradient of the road using one or more accelerometers provide within the system, either internally, or communicated externally, or via GPS and/or map data. The calculated figure can be displayed to the driver of the towing vehicle, and if the towed vehicle is overloaded or the tow ball load percentage is outside of the allowed limits, this situation will be communicated to the driver as requiring immediate attention.

It will be appreciated that the hitch system 15 of the present invention as described above, the computer device 42 is able to communicate with other control systems of the towed vehicle, such as a dynamic control system, sway control system and/or path controller should such systems be provided. The computer device 42 of the hitch system 15 can also output to a dedicated user interface, such as a display, smart phone or personal electronic device which can be used by a user to load the vehicle and monitor the vehicle during towing.

The system of the present invention provides a means to accurately detect forces acting upon the towed vehicle in up to 3 axes. Such forces are applied to the towing coupling/hitch of the towed vehicle through the connection to the vehicle. The system is also able to measure the relative angles between the towed vehicle and towing vehicle and process this data to provide more useful information to control the towing situation in use.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A hitching system for connecting a towed vehicle to a towing vehicle comprising:

a connector member for engaging with a connection point on the towing vehicle;

a shaft member connected at one end to the connector member and at a second opposing end to a main body fixed to the towed vehicle, the shaft member passes through a central recess formed in the main body;

a plurality of sensor elements mounted to said shaft member, at least one of the sensor elements configured to measure a lateral force present in the shaft member during towing of the towed vehicle by the towing vehicle; and a computer processor mounted with respect to the towed vehicle for receiving a signal from at least one of the sensor elements representative of the measure of the lateral force present in the shaft member and processing said signal to control motion of the towed vehicle.

2. A hitching system according to claim 1, wherein the connector member is connected to the connection point on the towing vehicle in an articulated manner such that multiple axes of movement of the towed vehicle are measured by the plurality of sensors.

3. A hitching system according to claim 1, wherein the plurality of sensors are mounted about a periphery of the shaft member at 90° spacings.

4. A hitching system according to claim 3, wherein the shaft member upon which the plurality of sensors are mounted is hollow.

5. A hitching system according to claim 1, wherein the plurality of sensor elements includes a rotation sensor for measuring rotation of the shaft member with respect to the towed vehicle.

6. A hitching system according to claim 1, wherein the computer processor is mounted to the main body.

7. A hitching system according to claim 1, wherein the computer processor processes said signal to control motion of the towed vehicle by alerting a driver of the vehicle of unsafe lateral forces present in the shaft member.

\* \* \* \* \*